(12) United States Patent
Aiello et al.

(10) Patent No.: US 6,900,567 B2
(45) Date of Patent: May 31, 2005

(54) CORNER THRUST-JOURNAL FLUID DYNAMIC BEARING

(75) Inventors: Anthony Joseph Aiello, Aptos, CA (US); Klaus Dieter Kloeppel, Watsonville, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/683,654

(22) Filed: Oct. 9, 2003

(65) Prior Publication Data

US 2004/0070298 A1 Apr. 15, 2004

Related U.S. Application Data

(60) Provisional application No. 60/417,017, filed on Oct. 9, 2002.

(51) Int. Cl.[7] .................................................. H02K 5/16
(52) U.S. Cl. .......................................... 310/90; 384/107
(58) Field of Search ................................ 310/90, 67 R; 384/100, 107, 112

(56) References Cited

U.S. PATENT DOCUMENTS

| | | | |
|---|---|---|---|
| 4,828,403 A | | 5/1989 | Schwartzman .............. 384/100 |
| 5,142,174 A | | 8/1992 | Ide ............................ 310/67 R |
| 5,215,385 A | | 6/1993 | Ide .............................. 384/100 |
| 5,223,758 A | * | 6/1993 | Kataoka et al. ................ 310/90 |
| 5,280,208 A | * | 1/1994 | Komura et al. ................ 310/90 |
| 5,977,674 A | * | 11/1999 | Leuthold et al. .............. 310/90 |
| 6,066,903 A | * | 5/2000 | Ichiyama ...................... 310/90 |
| 6,104,114 A | * | 8/2000 | Takeda et al. ................ 310/90 |
| 6,307,293 B1 | | 10/2001 | Ichiyama ................... 310/90.5 |
| 6,655,841 B1 | * | 12/2003 | Heine et al. ................ 384/110 |

* cited by examiner

*Primary Examiner*—Dang Le
(74) *Attorney, Agent, or Firm*—Morrison & Foerster LLP (57) ABSTRACT

A fluid dynamic bearing motor is provided having an annular sleeve, a shaft disposed through the sleeve, a hub supported on a first end of the shaft, a journal between the sleeve and the shaft, and a fluid dynamic bearing in the journal, wherein the fluid dynamic bearing comprises an axial bearing and a radial bearing, the axial and radial bearings being formed on respectively angles surfaces to form one corner bearing.

16 Claims, 9 Drawing Sheets

| CASE | CONFIGURATION | PRELOAD FORCE NEEDED? | ⊥ | // | <90° |
|---|---|---|---|---|---|
| A | | YES | Y | Y | N |
| B | | YES | N | Y | N |
| C | | YES | N | Y | Y |
| D | | YES | Y | N | N |
| E | | YES | N | N | N |
| F | | NO | N | N | N |
| G | | NO | Y | N | Y |

CORNER THRUST-JOURNAL FLUID DYNAMIC BEARING

CROSS REFERENCE TO RELATED APPLICATIONS

This application claims the priority of U.S. Provisional Application Ser. No. 60/417,017, filed Oct. 9, 2002 by Aiello (entitled "FDB Relief Slots For Reduced Power And Circulation"), which are herein incorporated by reference.

FIELD OF THE INVENTION

The present invention relates generally to fluid dynamic bearing motors, and relates more specifically to fluid dynamic bearing motors having grooved bearing surfaces.

BACKGROUND OF THE INVENTION

Disk drives are capable of storing large amounts of digital data in a relatively small area. Disk drives store information on one or more recording media, which conventionally take the form of circular storage disks (e.g. media) having a plurality of concentric circular recording tracks. A typical disk drive has one or more disks for storing information. This information is written to and read from the disks using read/write heads mounted on actuator arms that are moved from track to track across the surfaces of the disks by an actuator mechanism.

Generally, the disks are mounted on a spindle that is turned by a spindle motor to pass the surfaces of the disks under the read/write heads. The spindle motor generally includes a shaft and a sleeve into which the shaft is inserted. In order to facilitate relative rotation of the shaft and sleeve, one or more bearings are usually disposed between them.

Over the years, storage density has tended to increase, and the size of the storage system has tended to decrease. This trend has lead to greater precision and lower tolerance in the manufacturing and operating of magnetic storage disc drives.

The bearing assembly that supports the storage disk is of critical importance. One bearing design is a fluid dynamic bearing. In a fluid dynamic bearing, a lubricating fluid such as air or liquid provides a bearing surface between a fixed member of the housing and a rotating member of the disk hub. In addition to air, typical lubricants include gas, oil, or other fluids. The relatively rotating members may comprise bearing surfaces such as cones or spheres and hydrodynamic grooves formed on the members themselves. Fluid dynamic bearings spread the bearing surface over a large surface area, as opposed to a ball bearing assembly, which comprises a series of point interfaces. This bearing surface distribution is desirable because the increase bearing surface reduces wobble or run-out between the rotating the fixed members. Further, the use of fluid in the interface area imparts damping effects to the bearing, which helps to reduce non-repeatable run-out. Thus, fluid dynamic bearings are an advantageous bearing system.

In the field of fluid dynamic bearing motors for use in hard disc drives, some prior systems including, but not limited to, small form factor motor designs for mobile applications have been limited by stringent power and ever tightening track density requirements. In the traditional "single-plate" FDB design, axial stiffness is provided by two equally opposing thrust bearings and the bearing lubricant is retained by closing one bearing end and placing a capillary seal at the opposing end. This traditional approach results in two thrust bearing gaps at large diameters, thereby increasing bearing drag and overall motor power.

Furthermore, as motor designs decrease in size, axial space and power constraints become crucial. The limited journal bore length often results in unusual angular stiffness sensitivity. Traditionally, the angular stiffness problem has been addressed by employing large axial thrust bearings to augment the total bearing angular stiffness when axial space does not permit increasing journal span. However, this approach consumes a significant amount of power, and so has become a less favorable solution in smaller disk drives.

Thus, there is a need in the art for an efficient fluid dynamic bearing design that is capable of providing both radial and axial stiffness, especially within a very short axial height envelope.

SUMMARY OF THE INVENTION

This concept seeks to define a novel herringbone groove fluid dynamic bearing along the circumference of a part corner such that the additional unidirectional nature of thrust and journal type bearings is addressed. A herringbone fluid dynamic bearing is formed over the corner of a part such that the apex of the herringbone is located at the corner itself, and each of the groove legs pumping mutually toward the apex to build pressure is located on a different surface adjacent to the corner. This construction forms a single herringbone bearing with a bend angle in it resulting in both axial and radial force components and stiffness. The bend angle forming the part corner is typically 90°, but may be otherwise. Also, neither of the grooved surfaces need be parallel or perpendicular to the motor spin axis.

The present invention seeks to take advantage of the large angular stiffness associated with large diameter bearings while reducing bearing power by lowering the amount of bearing surface area. Angular stiffness in a bearing design is increased by enlarging the thrust diameter significantly, and then the large power tradeoff is reclaimed by removing some percentage of the bearing surface area. In order to ensure the bearing remains stable, the surface area removal is done symmetrically and in multiple regions (at last three). This technique can also be applied to journal bearings as well, or to adjacent journal and thrust bearings such that multiple lubricant circulation paths are introducing directly across the grooved regions.

A fluid dynamic bearing motor comprising an annular sleeve, a shaft disposed through the sleeve, a hub supported on a first end of the shaft, a journal between the sleeve and the shaft, and a fluid dynamic bearing in the journal, wherein the fluid dynamic bearing comprises a first bearing surface and a second bearing surface, the first bearing surface and the second bearing surface being adjacent to a corner, the corner being formed by an inclination angle of the first bearing surface and the second bearing surface. Each of the two regions that make up the corner bearing comprise a groove pattern such that the net pumping in the corner bearing is toward the corner. In a preferred form, one or more reliefs are defined the first bearing surface and/or the second bearing surface to define one or more bearing pads. This reduces the surface area acting as a bearing, and thereby power consumed as well. Preferably the bearing patterns comprise two spirals pumping mutually toward the corner.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
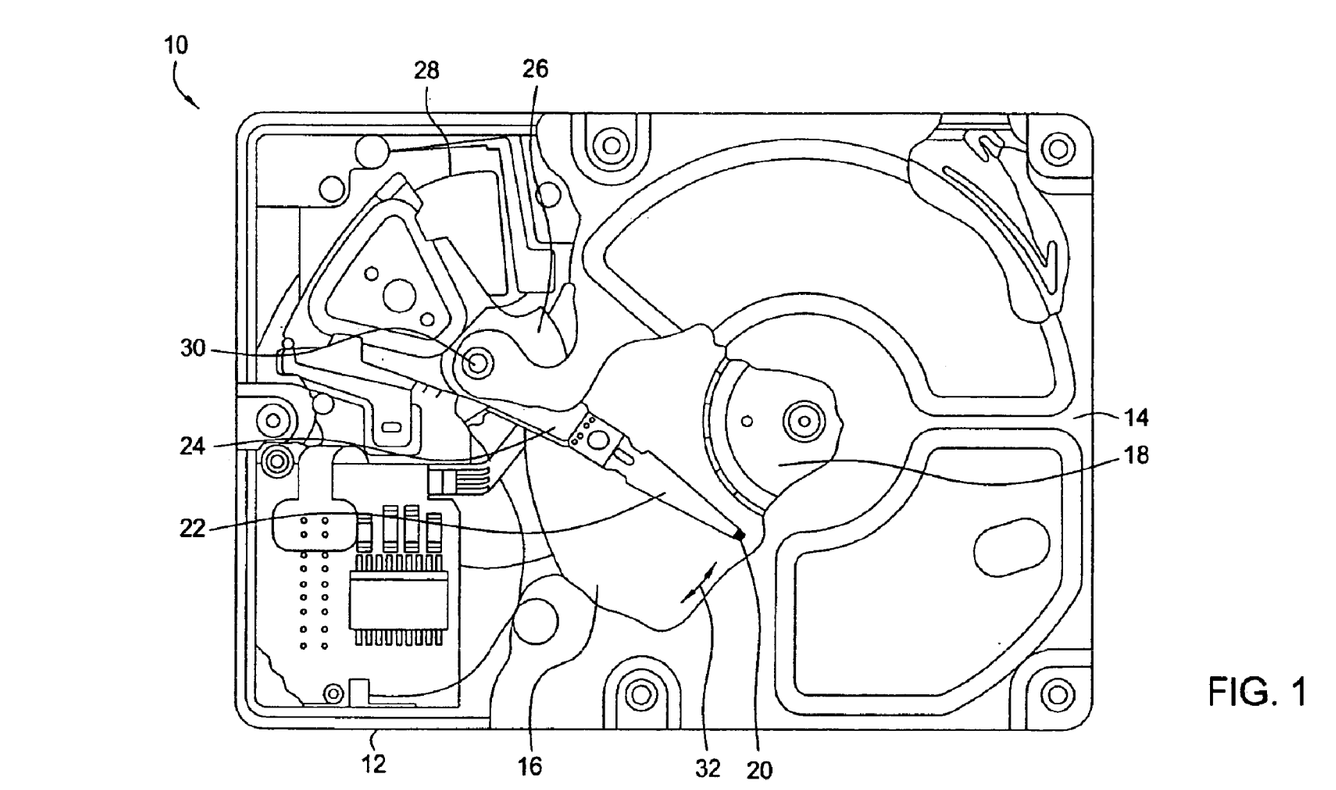
FIG. 1 depicts a plan view of one embodiment of a disk drive that comprises a motor in which the invention is used.

FIG. 1 depicts a plan view of one embodiment of a disk drive 10 for use with embodiments of the invention. Referring to FIG. 1, the disk drive 10 includes a housing base 12 and a top cover plate 14. The housing base 12 is combined with cover plate 14 to form a sealed environment to protect the internal components from contamination by elements outside the sealed environment. The base and cover plate arrangement shown in FIG. 1 is well known in the industry; however, other arrangements of the housing components have frequently been used, and aspects of the invention are not limited by the particular configuration of the disk drive housing. Disk drive 10 further includes a disk pack 16 that is mounted on a hub 202 (see FIG. 2) for rotation on a spindle motor (not shown) by a disk clamp 18. Disk pack 16 includes one or more of individual disks that are mounted for co-rotation about a central axis. Each disk surface has an associated read/write head 20 that is mounted to the disk drive 10 for communicating with the disk surface. In the example shown in FIG. 1, read/write heads 20 are supported by flexures 22 that are in turn attached to head mounting arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached read/write heads 20 about a pivot shaft 30 to position read/write heads 20 over a desired data track along a path 32.

Figure 2:
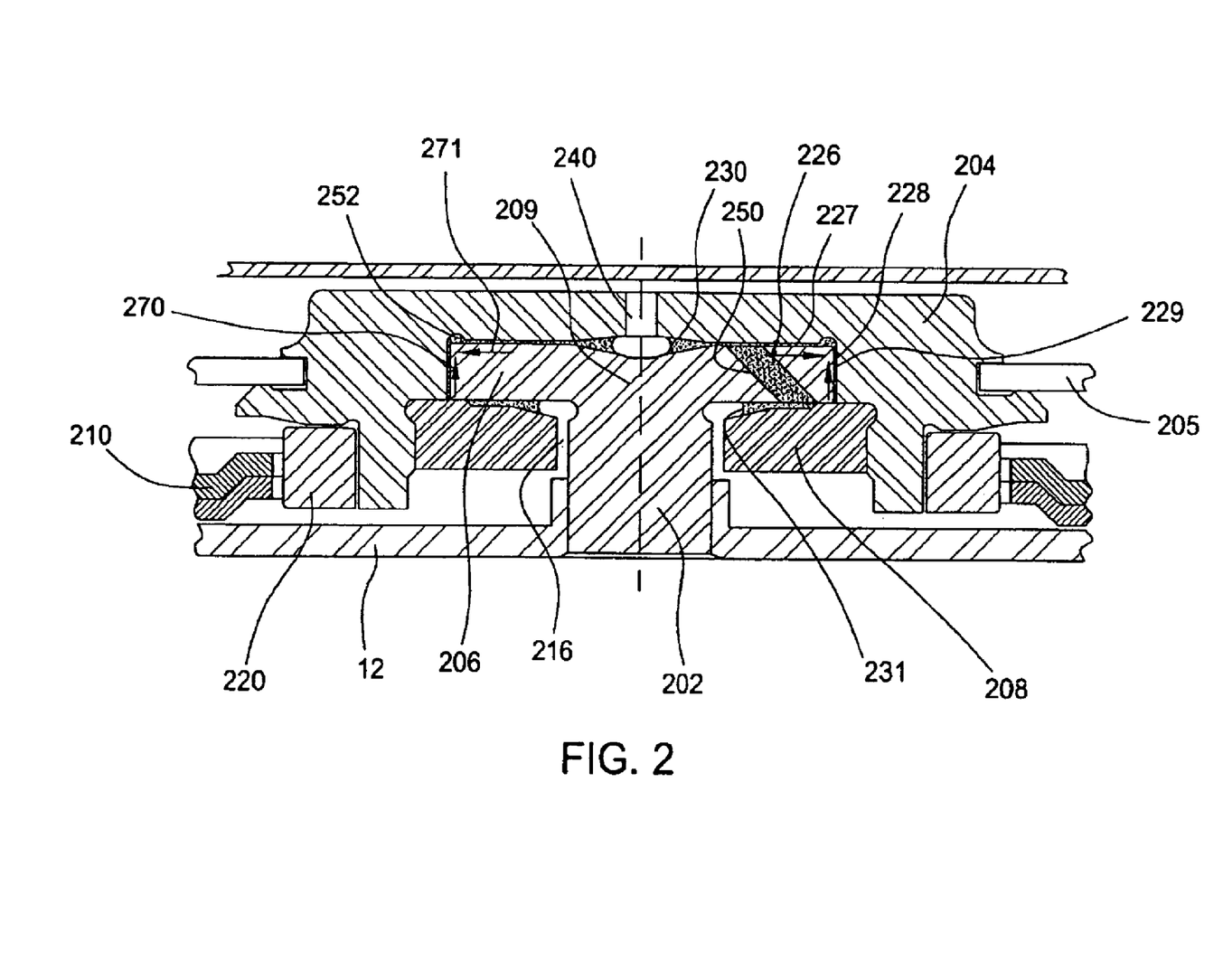
FIG. 2 depicts a side sectional view of a fluid dynamic bearing motor in which embodiments of the present invention may be employed.

FIG. 2 illustrates a cross sectional view of a fluid dynamic bearing motor 200 incorporating one embodiment of the invention.

A stationary assembly comprises a shaft 202 mounted at a first end 207 to a base 12. The shaft 202 may be, for example, screwed or press fit into place. A thrust plate 206 is integral with shaft 202 or is mounted, for example by press fitting to a second end 209 of the shaft 202. A stator 210 is mounted to the base 12 as well and comprises a plurality of "teeth" formed of a magnetic material such as steel, wherein each of the teeth is wound with a winding or wire.

The rotating assembly comprises a hub 204 rotatably supported by the first end 209 of the shaft 202, above the thrust plate 206. The hub 204 supports one or more disks 205 for rotation. A sleeve 208 supported from the hub 204 has a bore 216 through its center for receiving the shaft 202. A magnet 220 is mounted to the hub 204 and cooperates with the stator 210 to induce rotation of the hub 204 about the shaft 202.

In this embodiment (as in others described below) a herringbone fluid dynamic bearing is formed over the corner 252 of a cylindrical part 206 such that the apex of the herringbone is located at the corner itself 252, and each of the groove sections 226, 228 pumping mutually toward the apex (see arrows 270, 271) to build pressure is located on a different surface 227, 229 adjacent to the corner. This construction forms a single herringbone bearing with a bend angle in it resulting in both axial and radial force components and stiffness. The bend angle forming the part corner in this case is 90°, but may be otherwise. Also, neither of the grooved surfaces need be parallel or perpendicular to the motor spin axis. As will be described below, the grooves 226, 228 may be defined on either the exterior surfaces of the thrust plate or the interior surfaces of the hub.

In the case where one of the two grooved surfaces is parallel or perpendicular to the motor axis of rotation and the angle between the surfaces is greater than 90°, a constant axial bias force such as a magnetic one is typically needed to axially preload the bearing. This preload may be provided by axially offsetting the magnet 220 from stator 210, or by other means known to people of skill in this technology.

Capillary seals 230, 231 are defined by the diverging surfaces of the thrust plate 206 and sleeve 208 or hub 204; they cooperate with one or more angled circulation holes 250 inboard of the corner 252 to circulate fluid and purge air. The corner 252 functions as the bearing's chevron apex to support rotation of the hub 204. The capillary seal 230 defined between the thrust plate 206 and the hub 204 communicates with ambient pressure via a vent hole 240 disposed axially through the hub 204. The capillary seal 231 is defined between the thrust plate 206 and the sleeve 208.

In operation, the two groove sections 227, 229 pump fluid mutually toward the upper corner 252 which acts as the bearing's chevron apex. The two grooved surfaces act together, supplying axial, radial and angular stiffness. An angled circulation hole 250 inboard of the corner bearing allows lubricant flow induced by part tolerance variation without draining either of the two capillary centrifugal seals 230, 231 shown establishing a recirculation flow circuit to provide air purging.

Figure 3A:
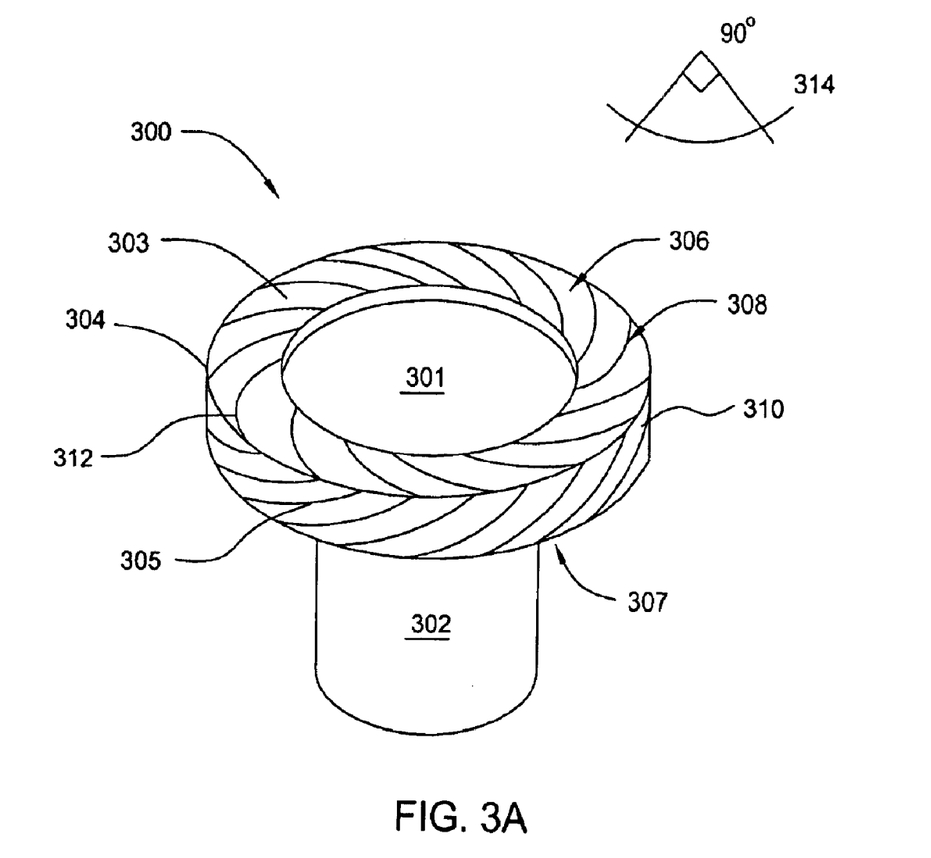
FIG. 3A illustrates a thrust plate and shaft according to a first embodiment of the present invention.

FIG. 3A depicts an embodiment of a grooved thrust plate 300 useable in the embodiment of FIG. 2. As illustrated, the thrust plate 300 comprises a substantially flat, annular ring 301 mounted on or integrated with one end of the shaft 302. In the embodiment depicted in FIG. 3A, a groove pattern 306 is formed over a corner 304 of the thrust plate 300. Specifically, in this embodiment, the grooves 306 are formed over a corner 304 defined by a first axial side 303 of the thrust plate 300 and the outer radial surface 305 of the plate 300 which serves as the journal bearing. The grooves 306 may alternately or additionally be formed over the corner defined by the second axial surface 307 of the plate 300, as well. Thus, a first "leg" 308 of the groove pattern 306 is formed on the first surface 303 of the thrust plate 300, and a second "leg" 310 is formed on the outer surface 305, such that the apex 312 of the grooves is located on the corner 304 itself. The first leg 308 may resemble a conventional spiral groove around the thrust plate surface, and the second leg 310 may also resemble a spiral groove. Those skilled in the art will recognize that other patterns are also useful. The grooves on the outer surface 305 of the thrust plate 300 form the journal grooves of the bearing assembly.

This groove pattern 306, with each leg 308, 310 located on a different surface adjacent the corner 304, is defined so that each of the groove legs 308, 310 pumps simultaneously toward the apex 312 to build pressure. Therefore, the groove pattern 306 is formed on two surfaces relatively inclined by angle 314 resulting in both axial and radial stiffness. The angle 314 may be ninety degrees as shown, or may be otherwise as described below. Although the grooved surfaces 303, 305 are parallel (as in the case of the outer circumference 305) and perpendicular (as in the first side 303) to the motor spin axis (which is longitudinally oriented through the shaft 202 in FIG. 2), neither of the grooved surfaces 303, 305 necessarily need be exactly parallel or perpendicular to the axis of spin for successful operation.

Figure 3B:
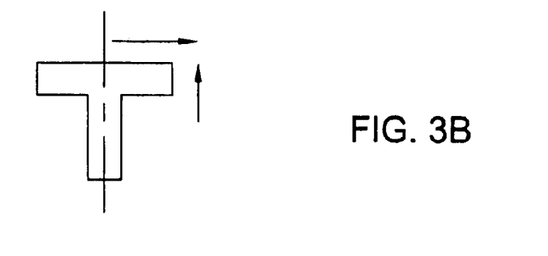
FIG. 3B is a table illustrating alternative configurations for the grooved surfaces of the thrust plate.

In the case where one of the two grooved surfaces 303, 305 is substantially parallel or perpendicular to the axis of spin, a constant axial force such as a magnetic bias is typically needed to preload the axial spiral leg (i.e., the first surface 303) of the corner groove 306. This may be accomplished by offsetting the hub magnet 220 axially relative to the stator 210, or other techniques known in the art. The table of FIG. 3B illustrates many of the configurations of grooved surfaces 303, 305 which are available with this invention. In the chart, surface 303 is the generally axial grooved surface region of thrust plate 300 forming a thrust bearing; surface 305 is the generally radial grooved surface region defining a journal bearing. The reference to ⊥ means the groove surface is substantially perpendicular to the shaft axis; the reference to // means the surface is generally parallel to the shaft axis. In addition to illustrating exemplary configurations, the chart teaches situations in which, for optimized operation, an axial preloading force should be used. Persons skilled in the art will recognize that cases E and F are exceptions to these general for using the axial preloading force.

Figure 3C:
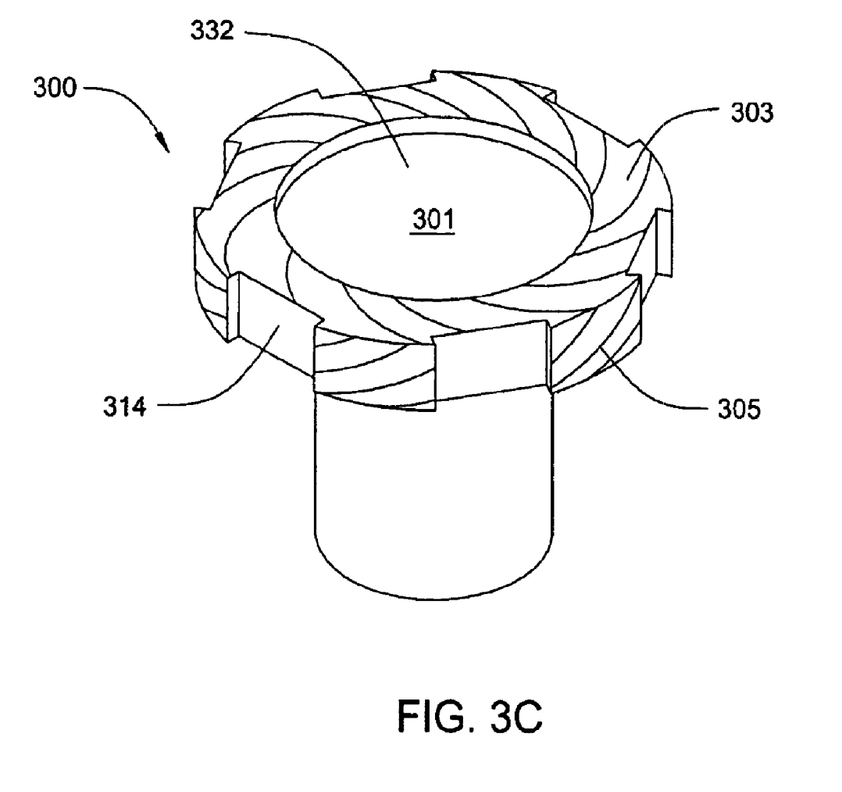
FIG. 3C illustrates a thrust plate and shaft according to a second embodiment of the present invention.

When forming the journal grooves on the outer circumference 305 of the thrust plate 300, the grooves occupy a much larger diameter than they would if formed on the inner diameter of the shaft 202. This results in greater motor power consumption due to the larger diameter. Therefore, as illustrated in FIG. 3C, the thrust plate 300 may comprise a plurality of reliefs 314 in the region of the radial bearings (i.e., on the thrust plate circumference 305). Removal of bearing surface area is preferably done symmetrically and in multiple regions to maintain bearing stability; the thrust plate 300 illustrated in FIG. 3C comprises six reliefs 314 through the journal bearing grooving region spaced evenly around the circumference 305 of the plate 300. Thus, the diameter of the thrust plate 300 may be increased to augment stiffness in the bearing, and the reliefs 314 help bring the resultant power increase back down to an efficient level. The amount of bearing surface area removed is, of course, limited by the amount of effective bearing area required for dynamic performance. The preferred shape of the reliefs is parallel to the grooves to minimize end-leakage efficiency losses, as shown in FIG. 3D, rather than in the axial direction shown in FIG. 3C; however, reliefs provide some benefit without being in the optimum orientation.

Figure 3D:
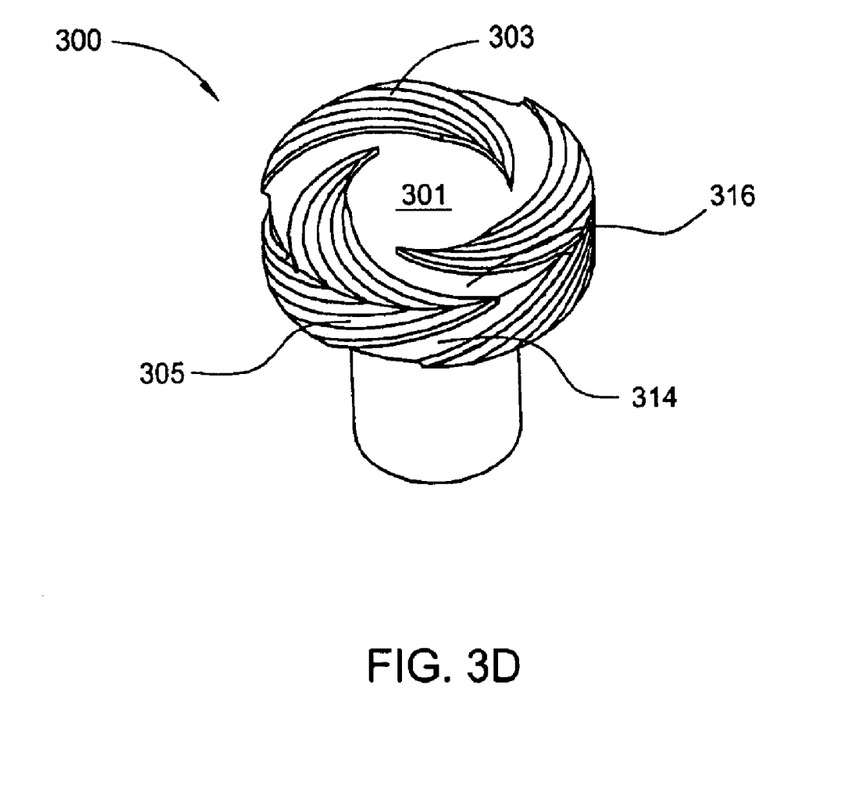
FIG. 3D illustrates a thrust plate and shaft according to a third embodiment of the present invention.

As illustrated in FIG. 3D, reliefs 314 and 316 may also be formed over the corner 304 on the axial bearing surface (i.e., the first surface 303 of the thrust plate 300) as well to further reduce power consumption. Reliefs 316 may be formed in addition to or instead of reliefs 314. The use of combined reliefs 314 and 316 provide fluid re-circulation paths across the thrust plate surfaces 303 and 305, and so the need for fluid re-circulation holes such as hole 250 in FIG. 2 is eliminated in designs employing these reliefs.

Figure 4:
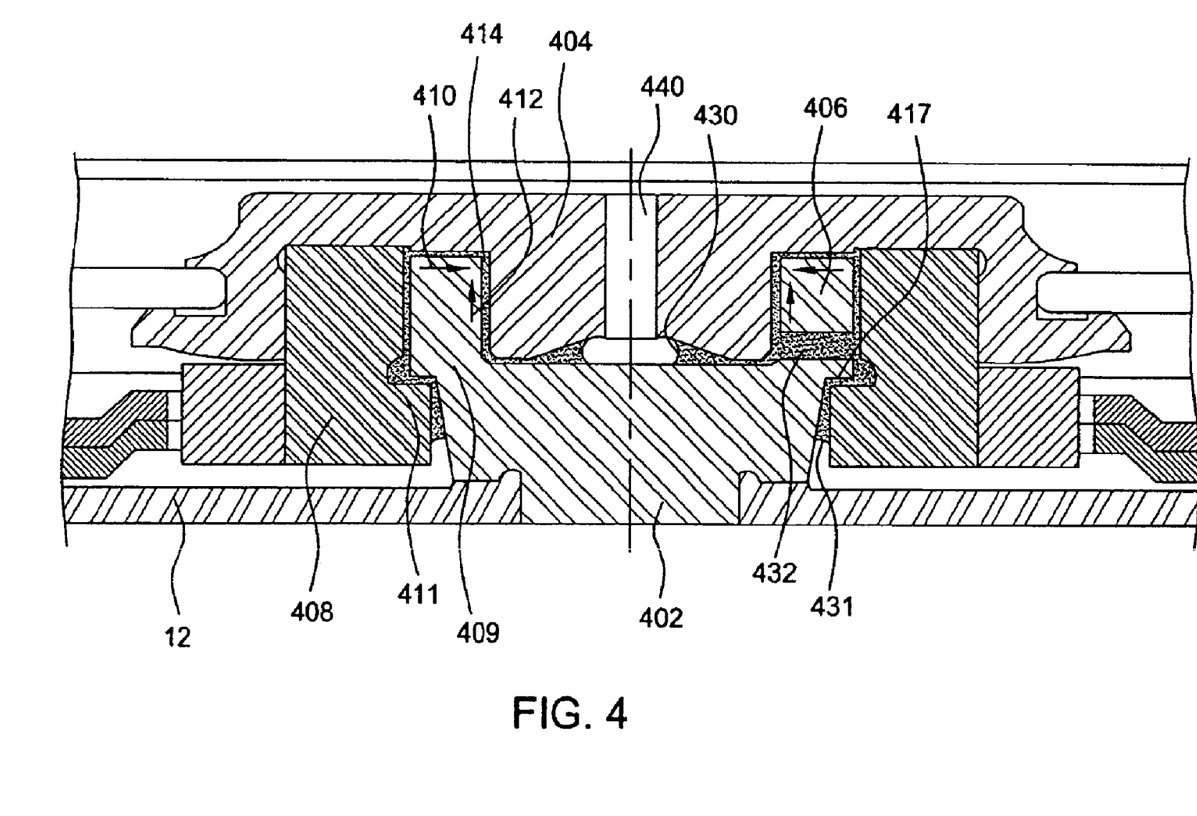
FIG. 4 depicts a side sectional view of a first alternative fluid dynamic bearing motor in which embodiments of the present invention may be employed.

The corner bearing groove design may also be used in alternate motor designs. For example, as illustrated in FIG. 4, a thrust ring 406 that extends axially from a first end 409 of the shaft 402 (rather than extending radially as illustrated in FIG. 3) may employ corner grooves covering a first thrust/surface 410 and an inner journal surface 412. Thus grooves are formed to pump toward a corner 414 at an inner diameter of the thrust plate 406. In this case, a magnetic bias force may also be needed as discussed above with respect to FIG. 3B, depending on the angular positions of the thrust and journal bearing surfaces.

A first capillary seal 430 is defined between the shaft 402 and the hub 404, and is in communication with ambient pressure via a vent hole 440 disposed axially through the center of the hub 404. A second capillary seal 431 is defined between the shaft 402 and the sleeve 408 which in this embodiment is a ring supported from the hub with a shoulder 411 extending axially below the thrust ring 406 to both define a fluid gap 417 around the bearing and capillary seal 431 with shaft 402 and limit axial motion of the hub 404. A fluid recirculation path 432 may extend through the thrust plate 406 and generally perpendicular to the shaft 402 to allow fluid flow induced by part tolerance variations without draining capillary seals 430, 431.

Figure 5:
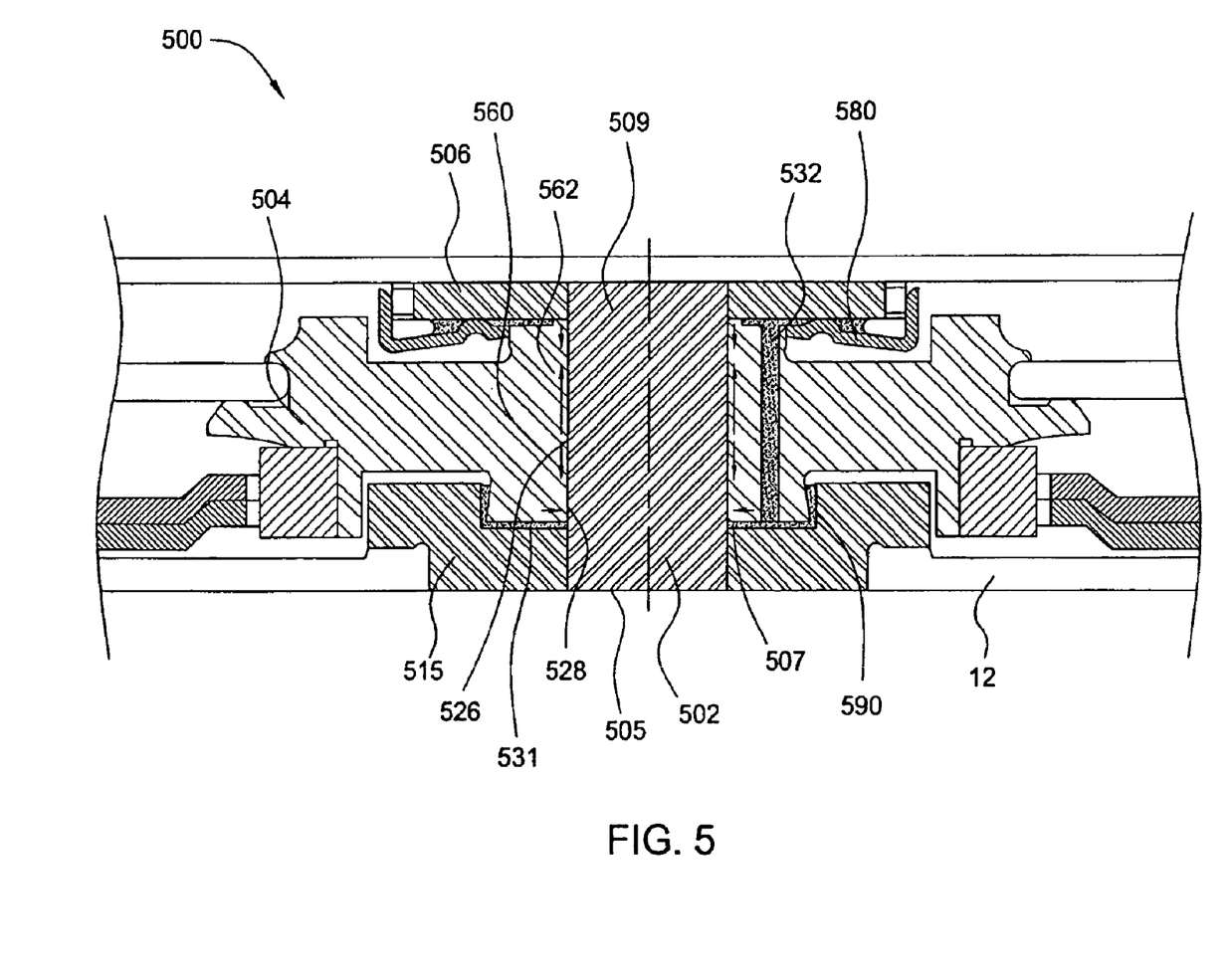
FIG. 5 depicts a side sectional view of a second alternative fluid dynamic bearing motor in which embodiments of the present invention may be employed.

FIG. 5 depicts a third embodiment of a fluid dynamic bearing motor 500, in which the present invention is utilized in conjunction with one or more journal bearings 560 and 562. The motor 500 features shaft 502 having a first plate 506 at a first end 509, and a second plate 515 at a second end 505. A hub 504 is supported for rotation by journal bearings 560 and 562 defined between surfaces of the hub 504 and shaft 502. The conventional journal bearing 560 comprises a traditional set of journal grooves (such as a chevron or sinusoid pattern) formed in a journal between at least one of the facing surfaces of the outer diameter 528 of the shaft 502 and the inner diameter 526 of the hub 504. In this case, the corner grooves are not formed on a thrust plate, but rather in a corner 507 defined by the meeting surfaces of a first side 531 of the second plate 515 and the outer diameter 528 of the shaft 502. One leg of the groove pattern is formed on the outer diameter 528 of the shaft 502, while the second leg of the pattern is formed on the first side 531 of the first plate 506. Or alternatively, the grooves could be formed on the corner surfaces of hub 504, adopting the principles of FIGS. 3A–3C above. Thus, the legs pump toward the corner 507, as illustrated by the arrows. As in previous embodiments, each leg of the corner groove pattern is preferably either parallel or perpendicular to the motor's spin axis, and thus, an axial bias force (such as that created by a stator/magnet offset) is necessary. A fluid re-circulation path 532 extends substantially parallel to the shaft 502, and is disposed through the hub 504. The re-circulation path 532 connects two capillary seals 580, 590 defined proximate opposite ends of the shaft 502 to maintain fluid levels and eliminate air bubbles. Seals are provided at either end of the journal bearing, which is shown as comprising one region 560 nearest the corner 507 which provides a net pressure toward the corner 507 and the second plate 515; and a second region 562 axially spaced from the first region 560 which is balanced, as shown. The pressures in the corner region 507 are established to achieve any targeted design goal. Sealing of the system is provided by a radial capillary seal 580 located radially out board of the recirculation path 532 but fluidly coupled to the journal bearings 560 and 562; and at the other end by an axial capillary seal 590 defined by hub 504 and the second plate 515.

Figure 6:
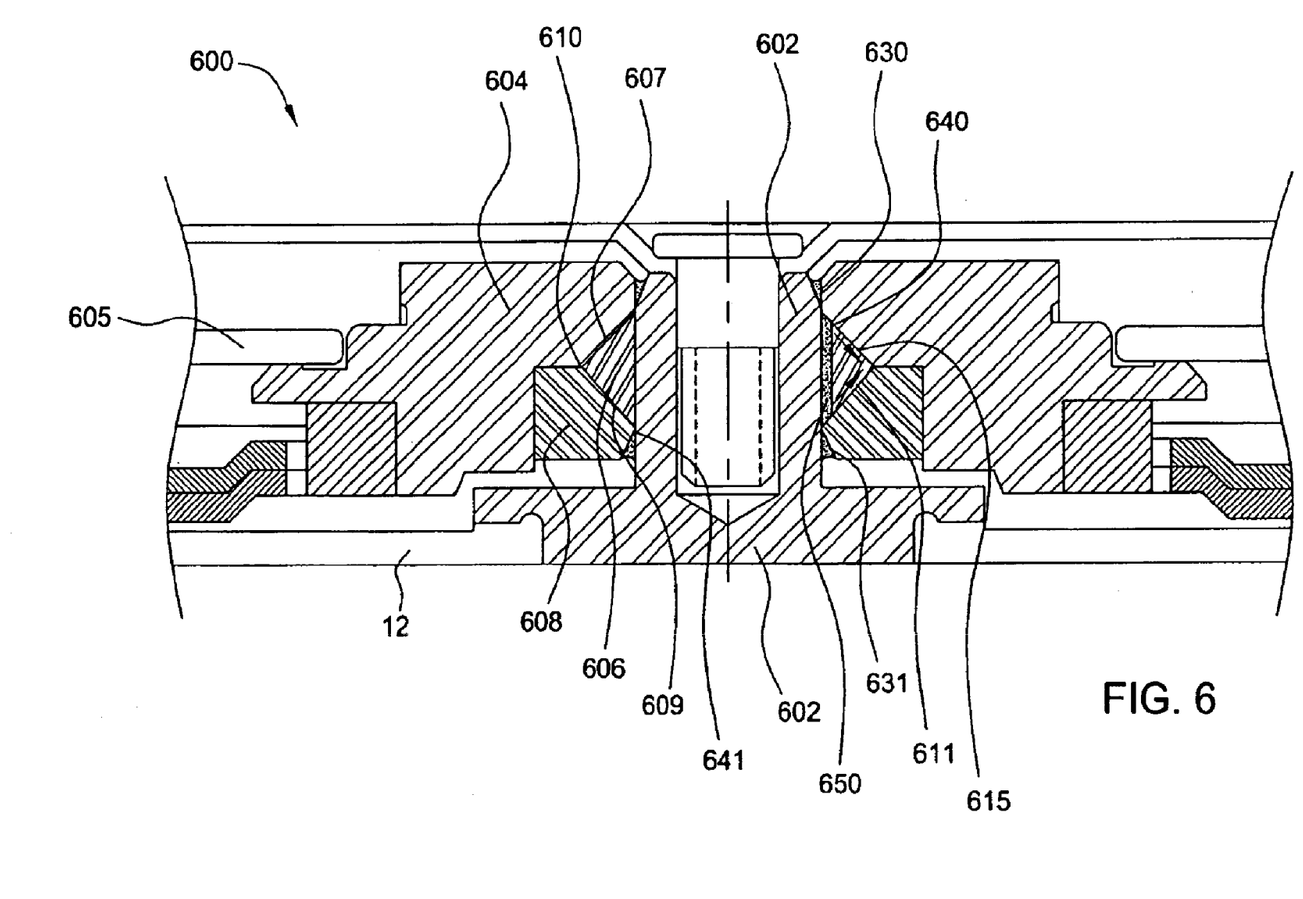
FIG. 6 depicts a side sectional view of a third alternative fluid dynamic bearing motor in which embodiments of the present invention may be employed.

A fourth embodiment of the invention is depicted in FIG. 6. In the fluid dynamic bearing motor 600 illustrated, a fixed shaft 602 is disposed through a rotating two-piece sleeve 608 and hub 604 and supported by the base 12. The hub 604 supports one or more discs 605.

The shaft 602 further comprises a conical part 606 affixed to its outer diameter. The conical part 606 comprises two angled surfaces 607, 609 that meet at a corner 610. Corner bearing grooves such as those described above at FIGS. 3A–3D may be formed on the conical bearing surfaces 607 and 609 so that the grooves pump fluid toward the corner 610. Thus, the corner bearing grooves will be inclined relative to the motor 600's spin axis (i.e., neither surface of the conical part 606 is parallel or perpendicular to the motor's spin axis). Furthermore, although the conical part 606 comprises a corner 610 that is ninety degrees, the corner angle does not necessarily need to be a right angle. Inclination of the corner bearing grooves enables them to provide both upward and downward thrust, (the arrows 611, 615 indicate pumping direction of the grooves) such that a constant axial bias force is unnecessary (as opposed to in the preceding embodiments in FIGS. 2–5). Both legs of the corner groove contribute to axial and radial stiffness. One or more fluid circulation paths 650 are preferably provided interior to the corner bearing groove patterns to provide and maintain fluid over the bearing surface. A first capillary seal 630 is defined proximate a first axial end 640 of the bearing surface 606, between the hub 604 and the shaft 602. A second capillary seal 631 is defined between the shaft 602 and the sleeve 608 proximate a second axial end 641 of the bearing surface 606.

Thus the present invention represents a significant advancement in the field of fluid dynamic bearing design. The configurations of thrust bearing and journal bearing surfaces diagrammed in the Table 3B may be used in any of the exemplary embodiments above and others within the scope of the claims. Furthermore, reliefs in the grooved surfaces may be used to reduce power consumption increased by the augmentation in bearing diameter and to provide alternate fluid circulation means.

While the foregoing is directed to embodiments of the invention, other and further embodiments of the invention may be devised without departing from the basic scope thereof, and the scope thereof is determined by the claims that follow.

What is claimed is:

1. A fluid dynamic bearing motor comprising an inner and outer member defining a gap therebetween, and supported for relative rotation by a grooved corner bearing facing the gap, the grooved corner bearing comprising first and second adjacent grooved surfaces at an angle to each other at a corner to form a single groove pattern over the corner, wherein the single groove pattern includes a single apex, the apex located at the corner to pump fluid in the gap toward the corner.

2. A fluid dynamic bearing motor as claimed in claim 1 wherein at least one of the grooved surfaces is parallel to or perpendicular to a spin axis of rotation of one of the elements.

3. A fluid dynamic bearing motor as claimed in claim 2 including a magnetic bias circuit for maintaining relative axial positioning.

4. A fluid dynamic bearing motor as claimed in claim 2 wherein the inner member comprises a thrust plate and the outer member comprises a hub, the first and second grooved surfaces defining a thrust bearing and a journal bearing on a radial surface of the thrust plate to support the hub for rotation.

5. The fluid dynamic bearing motor of claim 4 further comprising a plurality of reliefs, extending across the groove thrust bearing surface of the thrust plate, each of the reliefs being aligned with at least one of the reliefs extending across the grooved journal bearing surface.

6. A fluid dynamic bearing motor as claimed in claim 4 further including at least one recirculation hole extending between upper and lower surfaces of the thrust plate.

7. A fluid dynamic bearing motor as claimed in claim 4 wherein the gap between the thrust plate and the hub which defines the journal bearing and the thrust bearing continues around the second axial surface of the thrust plate, each end of the gap defined between the hub and the thrust plate and a sleeve and the thrust plate ending in a capillary seal.

8. A fluid dynamic bearing motor as claimed in claim 1 wherein at least one of the grooved surfaces comprises at least one relief extending through the grooved portion of the surface.

9. The fluid dynamic bearing motor of claim 8 further including a plurality of reliefs disposed around the bearing surface.

10. A fluid dynamic bearing motor as claimed in claim 9 wherein the reliefs have sufficient depth to allow fluid circulation flow through the reliefs.

11. A fluid dynamic bearing motor as claimed in claim 9 wherein the reliefs extend parallel to the groove pattern from one edge of the groove pattern to a second edge.

12. A fluid dynamic bearing motor as claimed in claim 8 wherein the at least one relief extends across the groove portion of each of the first and second grooved surfaces.

13. A fluid dynamic bearing motor comprising a shaft having a first end adapted to be supported from a base, a thrust plate supported from or integrated with an end of the shaft distal from the first end, a hub supported for rotation over the shaft and thrust plate, and a fluid dynamic bearing between the thrust plate and the hub wherein the fluid dynamic bearing comprises a grooved journal bearing on an outer radial surface of the thrust plate and a grooved thrust bearing formed on an axially outer surface of the thrust plate, the grooved journal bearing and the grooved thrust bearing forming a single grooved pattern over a corner of the thrust plate configured to pump fluid toward the corner, wherein the single groove pattern includes a single apex, the apex located at the corner.

14. A fluid dynamic bearing motor comprising a shaft from a first end adapted to be supported from a base, a thrust ring supported from an end of the shaft distal from the base and a hub supported for rotation relative to the shaft and thrust ring, and a fluid dynamic bearing between the thrust ring and the hub wherein the fluid dynamic bearing comprises a grooved journal bearing on an inner radial surface of the thrust ring and a grooved thrust bearing on an axial surface of the thrust ring, the grooved journal bearing and the grooved thrust bearing forming a single grooved pattern over a corner of the thrust ring configured to pump fluid toward the corner, wherein the single groove pattern includes a single apex, the apex located at the corner.

15. A fluid dynamic bearing motor comprising a shaft having a first plate supported at or near a first end and a second plate supported at or near a second end, a hub supported for rotation relative to the shaft and plates, and a fluid dynamic bearing supporting the hub for rotation relative to the shaft, the fluid dynamic bearing comprising bearing grooves having a journal portion defined on one of the surfaces defining a gap between the shaft and the hub and a thrust portion defined on a surface between one of the first and second plates and the hub, the journal bearing portion and the thrust bearing portion being configured to pump fluid toward a common apex located at a corner.

16. A fluid dynamic bearing motor as claimed in claim 15, further comprising a fluid recirculation path extending axially from a gap between the hub and a surface of the first plate to a gap between the hub and the surface of the second plate, a radial capillary seal defined adjacent the fluid recirculation path for maintaining fluid in the fluid bearing system and for allowing the escape of air bubbles from the fluid dynamic bearing, and a capillary seal adjacent the second end of the axial fluid recirculation path.

* * * * *